Patented Apr. 27, 1954

2,676,975

UNITED STATES PATENT OFFICE 2,676,975

PROCESS FOR PRODUCTION OF PHOSPHATE ESTERS

Fred Fortess, Summit, and Conrad Hohing, Jr., Morristown, N. J., and Joseph Rio, Cumberland, Md., assignors to Celanese Corporation of America, New York, N. Y., a corporation of Delaware No Drawing. Application August 31, 1950, Serial No. 182,614

6 Claims. (Cl. 260—46)

This invention relates to phosphate esters and relates more particularly to an improved process for the production of phosphate esters by the reaction of an organic compound containing a free hydroxyl group with a dispersion in an inert diluent of a solid, ester-forming phosphorus acid derivative.

Phosphate esters have long been used as plasticizers, lubricants, hydraulic fluids, gas filters, textile lubricants and the like, either alone or in admixture with other materials. According to one method commonly employed for the production of these phosphate esters, a solid, ester-forming phosphorus acid derivative such as phosphorus pentoxide is added gradually and with heating to an organic compound containing a free hydroxyl group until the desired reaction has been effected as evidenced by the disappearance of the solid phosphorus pentoxide particles, which normally requires several hours. This process usually leads to the production of dark, gummy materials which must be separated from the desired phosphate esters by an involved and expensive purification process. In addition, during the initial stages of the reaction, the phosphorus pentoxide molecules available for reaction on the surface of the particles of phosphorus pentoxide that are added to the organic compound being phosphated will be in contact with a large excess of said organic compound, facilitating the formation of di- and tri-phosphates. When it is desired to produce acid phosphate esters, such as mono-phosphates, di-phosphates or a mixture of mono- and di-phosphates, the formation of tri-phosphates will not only render non-uniform and contaminate the desired product, but will also leave an insufficient quantity of the organic compound containing a free hydroxyl group to react with all of the phosphorus pentoxide so that the mixture will contain free phosphorus acids at the completion of the reaction. This tendency is magnified by the agglomeration of the solid, ester-forming phosphorus acid derivative into lumps which require an extended period of time to react completely with the organic compound being phosphated. For certain purposes, where the phosphate ester is blended with an amine, as in the production of textile lubricants, the presence of any free phosphorus acids is extremely undesirable since it will lead to the precipitation of amine phosphates.

It is an important object of this invention to provide a process for the production of phosphate esters which will be free from the foregoing and other disadvantages of the processes that have hitherto been used for this purpose and a process which will be especially simple and efficient in operation.

A further object of this invention is to provide a process for the production of phosphate esters by the reaction of an organic compound containing a free hydroxyl group with a dispersion in an inert diluent of a solid, ester-forming phosphorus acid derivative.

Other objects of this invention will be apparent from the following detailed description and claims.

According to the present invention, a solid, ester-forming phosphorus acid derivative is dispersed in an inert diluent. The dispersion so formed is then mixed with an organic compound containing a free hydroxyl group to produce, in a relatively short period of time, phosphate esters which are free from dark, gummy materials and which may be used without further purification or with a very minimum of such purification. The process of this invention is particularly advantageous for the production of acid phosphate esters since it leads to the formation of homogeneous products containing substantially no free phosphorus acids.

Suitable solid, ester-forming phosphorus acid derivatives for carrying out the process of this invention include, for example, phosphorus pentoxide, phosphorus tetroxide and phosphorus pentachloride. Of these, phosphorus pentachloride is somewhat less desirable since it liberates hydrochloric acid, which is extremely corrosive, during the esterification. The solid, ester-forming phosphorus acid derivatives may be dispersed in any liquid which will not react with the reactants, which are the ester-forming phosphorus acid derivative and the organic compound containing the free hydroxyl group, or with the phosphate ester which is formed. The inert diluent may be a readily volatile liquid such as, for example, benzene, xylene, ether, pentane, or a low boiling hydrocarbon fraction, in which case the diluent may be removed from the phosphate ester by a simple distillation following the esterification. Alternatively, the diluent may, for example, be a mineral oil, higher boiling saturated petroleum fraction, or other relatively non-volatile material, in which case the phosphate ester is not separated from the diluent, but is employed in admixture therewith. The dispersion may be formed by mixing together, in any suitable manner, the solid, ester-forming phosphorus acid derivative and the inert diluent, preferably employing from about 15 to 25 parts by weight of the ester-forming phosphorus acid derivative for each 100 parts by weight of the inert diluent.

The dispersion of the solid, ester-forming phosphorus acid derivative is then mixed with an organic compound containing a free hydroxyl group to form the phosphate ester. When acid phosphate esters are being produced, the organic compound being phosphated is preferably added to the dispersion so as to avoid the contact of the solid, ester-forming phosphorus acid derivative with an excess of said organic compound, which would tend to lead to the production of triphosphates. The dispersion and the organic compound containing a free hydroxyl group may also be introduced simultaneously and in the proper proportions into a reaction chamber where the phosphate ester is formed. The molar ratio of the organic compound containing a free hydroxyl group to the ester-forming phosphorus acid derivative will depend upon the nature of the phosphate ester desired. For example, a large excess, say, from about 3.0 to 4.0 moles of the organic compound containing a free hydroxyl group is employed for each mole, calculated as phosphoric acid, of the ester-forming phosphorus acid derivative when it is desired to produce a triphosphate. When, on the other hand, it is desired to produce an acid phosphate, there is employed from about 1.5 to 2.0 moles of the organic compound containing a free hydroxyl group for each mole of the ester-forming phosphorus acid derivative, calculated as phosphoric acid. The reaction is carried out at a temperature of from about 50 to 100° C. for a period of from about 10 to 60 minutes. Suitable organic compounds containing a free hydroxyl group that may be employed in producing phosphate esters in accordance with the process of this invention are the alcohols, including, for example, n-propanol, n-butanol, n-hexanol, n-decanol, mixed decanol, 3,5,5-trimethylhexanol, 2-butyloctanol, trimethylnonylalcohol and diisobutylcarbinol; and the phenols, including, for example, phenol, cresol and xylenol.

The following examples are given to illustrate this invention further:

*Example I*

A dispersion is formed by mixing 695 parts by weight of a mineral oil having a Saybolt Universal viscosity of 50 seconds at 100° F. with 142 parts by weight of phosphorus pentoxide. To this dispersion are added rapidly with stirring 553 parts by weight of n-decanol and the mixture is heated to 80° C. for 20 minutes, cooled and filtered. There is obtained a clear liquid containing less than 0.1% by weight of free acid, calculated as phosphoric acid, and having a Saybolt Universal viscosity of 92 seconds at 100° F., which may be employed without further treatment for the production of textile lubricants.

*Example II*

The process of Example I is repeated, employing 653 parts mineral oil, 142 parts phosphorus pentoxide and 511 parts by weight of 3,5,5-trimethylhexanol in place of the n-decanol. There is obtained a clear liquid containing 0.1% by weight of free acid, calculated as phosphoric acid, and having a Saybolt Universal viscosity of 91 seconds at 100° F. which may be employed, without further treatment, for the production of textile lubricants.

*Example III*

A dispersion is formed by mixing 653 parts by weight of benzene with 142 parts by weight of phosphorus pentoxide. To this dispersion are added, rapidly with stirring 511 parts by weight of 3,5,5-trimethylhexanol and the mixture is refluxed at 90° C. for 10 minutes. The benzene is then stripped off under vacuum. There is obtained a light-colored viscous liquid containing 0.47% of free acid, calculated as phosphoric acid, which may be employed, without further treatment, for the production of textile lubricants or may be applied from aqueous solution after neutralization as an anti-static finish on textile materials.

It is to be understood that the foregoing detailed description is given merely by way of illustration and that many variations may be made therein without departing from the spirit of our invention.

Having described our invention, what we desire to secure by Letters Patent is:

1. Process for the production of phosphate esters, which comprises reacting a hydroxyhydrocarbon with a dispersion in mineral oil of a solid, ester-forming phosphorus acid derivative at a temperature of about 50 to 100° C. for a period of about 10 to 60 minutes.

2. Process for the production of phosphate esters, which comprises reacting a hydroxyhydrocarbon with a dispersion in mineral oil of phosphorus pentoxide at a temperature of about 50 to 100° C. for a period of about 10 to 60 minutes.

3. Process for the production of acid phosphate esters, which comprises adding an organic compound containing a free hydroxyl group to a dispersion in mineral oil of a solid, ester-forming phosphorus acid derivative at a temperature of about 50 to 100° C. for a period of about 10 to 60 minutes.

4. Process for the production of phosphate esters, which comprises reacting an alkanol with a dispersion in mineral oil of phosphorus pentoxide at a temperature of about 50 to 100° C. for a period of about 10 to 60 minutes.

5. Process for the production of phosphate esters, which comprises adding an alcohol to a dispersion in mineral oil of phosphorus pentoxide, and heating the mixture to a temperature of about 50 to 100° C. for a period of about 10 to 60 minutes, there being employed about 1.5 to 2.0 moles of alcohol for each mole of phosphorus pentoxide, calculated as phosphoric acid.

6. Process for the production of acid phosphate esters, which comprises adding an alcohol to a dispersion of phosphorus pentoxide in mineral oil, said dispersion containing from about 15 to 25 parts by weight of phosphorus pentoxide for each 100 parts by weight of mineral oil, and heating the mixture to a temperature of about 50 to 100° C. for a period of about 10 to 60 minutes, there being employed about 1.5 to 2.0 moles of alcohol for each mole of phosphorus pentoxide, calculated as phosphoric acid.

References Cited in the file of this patent

UNITED STATES PATENTS

| Number | Name | Date |
| --- | --- | --- |
| 1,959,228 | Blagden | May 15, 1934 |
| 2,272,668 | Honel | Feb. 10, 1942 |
| 2,373,627 | Dietrich | Apr. 10, 1945 |
| 2,526,179 | West | Oct. 17, 1950 |

OTHER REFERENCES

Langheld, Ber. Deut. Chem., vol. 43, pages 1857–1869 (1910).

Hochwalt, Ind. and Eng. Chem., vol. 34, pages 20–21 (1942).

Kosolapoff, Organo-Phosphorus Compounds, pages 220–221 (1950).